Aug. 23, 1960 — L. H. KOLTUN — 2,949,628
LOCKABLE HINGE FOR A CHILD'S CAR BED
Filed Jan. 27, 1958 — 2 Sheets-Sheet 1
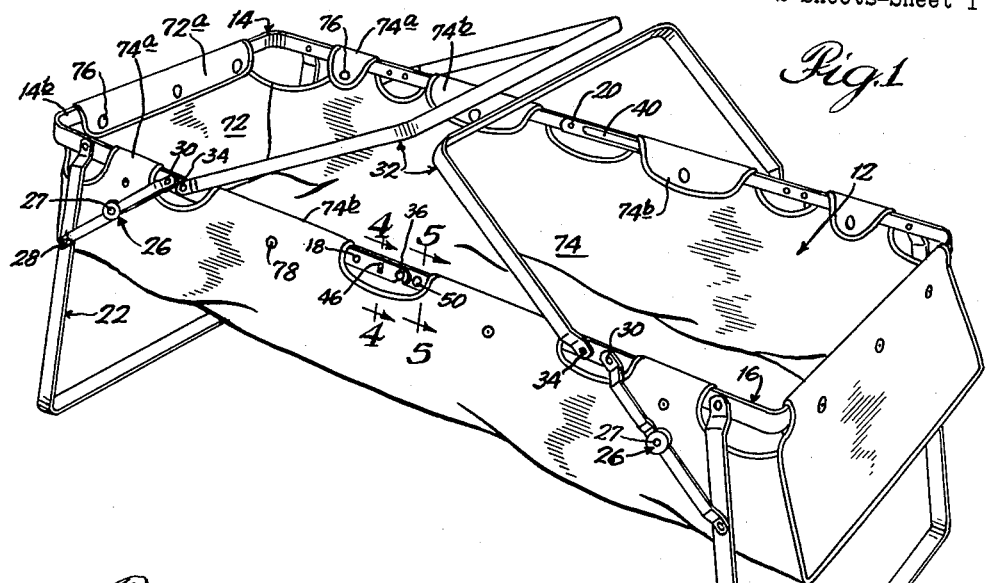
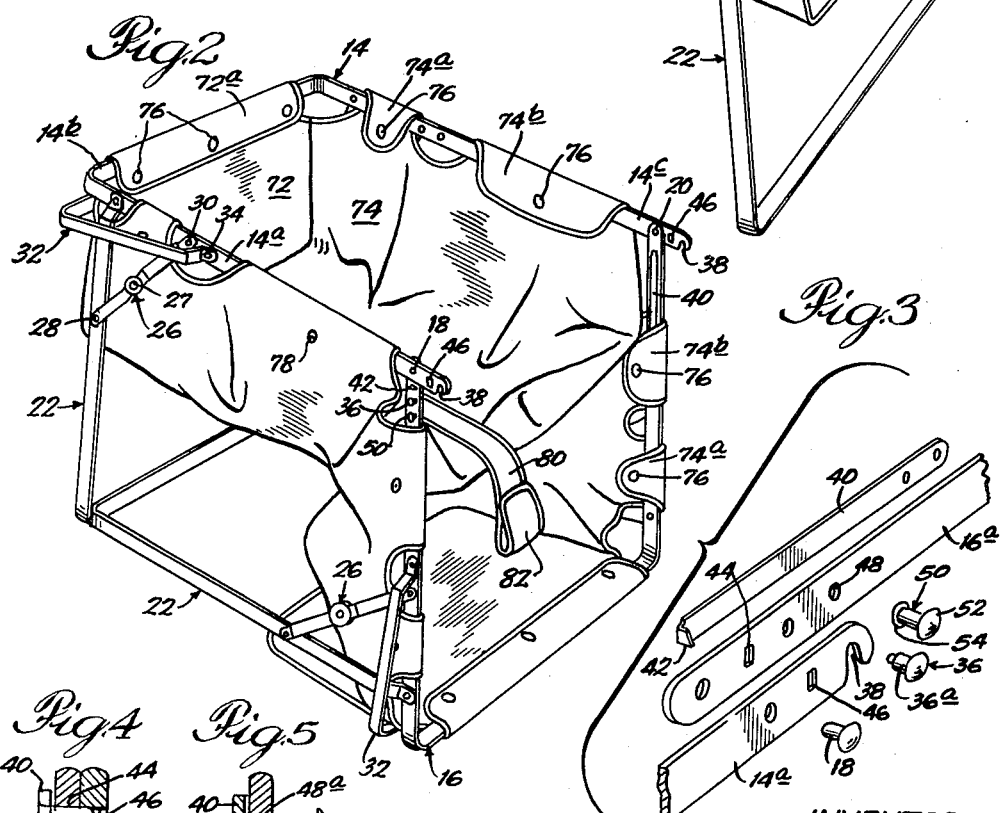
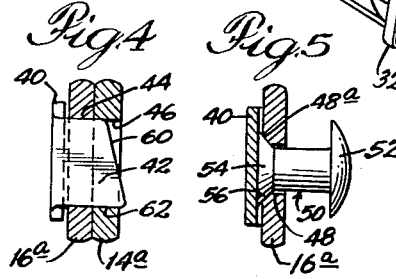
INVENTOR:
Leo H. Koltun,
BY Bair, Freeman & Molinare
ATTORNEYS.

Aug. 23, 1960 L. H. KOLTUN 2,949,628
LOCKABLE HINGE FOR A CHILD'S CAR BED
Filed Jan. 27, 1958 2 Sheets-Sheet 2
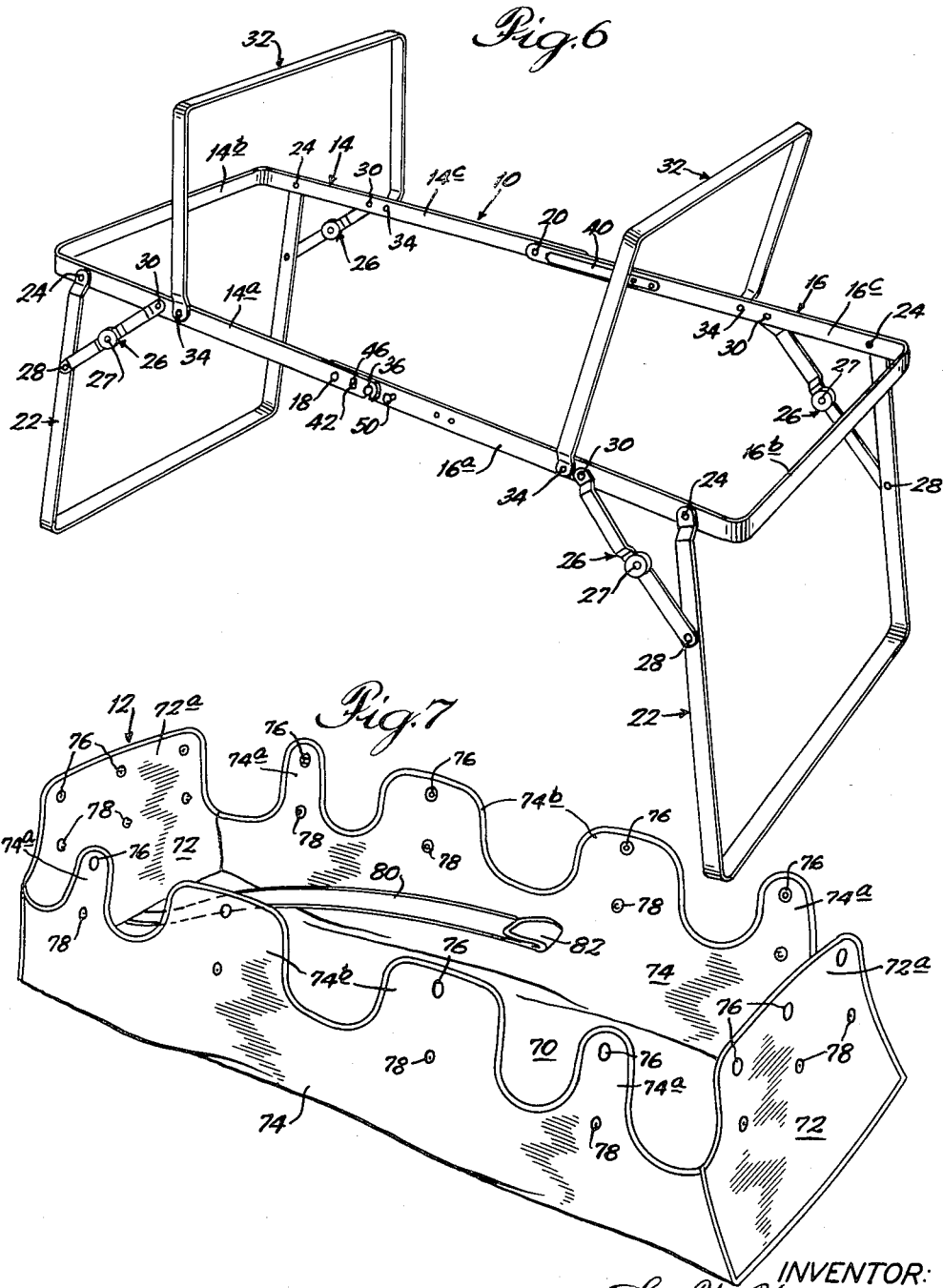
INVENTOR:
Leo H. Koltun,
BY Bair, Freeman & Molinare
ATTORNEYS.

United States Patent Office 2,949,628
Patented Aug. 23, 1960

2,949,628

LOCKABLE HINGE FOR A CHILD'S CAR BED

Leo H. Koltun, 6622 N. Francisco St., Chicago, Ill.

Filed Jan. 27, 1958, Ser. No. 711,438

1 Claim. (Cl. 16—145)

This invention relates to a car bed for infants, and more particularly to a simplified and improved construction therefor.

In the past car beds have been constructed so that the infant-supporting member, or bag, is provided with a permanent looped marginal edge into which the border frame is threaded during the assembly of the bag onto the frame. In the final assembled product, the bag is riveted, or in other equivalent way secured, to the frame as a permanent installation. The trouble with such constructions is two-fold. First, the bag must be assembled on the frame prior to shipment. Since the frame is generally made up of a plurality of parts, the bag must be subassembled with parts of the frame prior to final assembly. This makes a semi-assembled product which is troublesome to handle in a factory; and furthermore the sub-assembly requirement increases the ultimate cost of the product. The second trouble involves the fact that the finished product, when used, often becomes soiled, and the washing out of the bag which is permanently attached to the frame presents real problems.

It is an object of this invention to provide a car bed construction which avoids the aforestated problems by providing a child-supporting bag which may be simply and easily assembled or disassembled onto a finished car bed frame, thereby avoiding sub-assembly problems in the factory, and permitting selective disconnection of the bag from the car bed frame for cleaning purposes.

Another object of this invention is to provide a car bed construction which lends itself to simplified assembly and to simplified packing and storage thereof.

A further object of this invention is to provide a foldable car bed frame that is provided with improved latching means for rigidly maintaining the frame in its unfolded condition and which also permits of simple selective unlatching to permit of folding the car bed frame, as desired.

Still another object of this invention is to provide a child's car bed which is characterized by its simplicity and inexpensiveness of construction.

Further objects and advantages of this invention will become apparent as the following description proceeds and the features of novelty which characterize this invention will be pointed out with particularity in the claim annexed to and forming part of this application.

A preferred embodiment of the invention is shown in the accompanying drawings, in which:

Figure 1 is a perspective view of the assembled car bed of this invention when it is fully unfolded for use as a bed.

Figure 2 is a perspective view showing the device of Figure 1 in a partially folded condition when it is being used as a car seat.

Figure 3 is an enlarged exploded view in perspective, of the latching mechanism for the car bed frame.

Figure 4 is a fragmentary cross-section view taken on line 4—4 of Figure 1.

Figure 5 is a fragmentary cross-section view taken on line 5—5 of Figure 1.

Figure 6 is a perspective view of one sub-assembly consisting of the car bed frame itself, and Figure 7 is a perspective view of the child-supporting bag when it is disassembled from the car bed frame.

Referring now to the drawings, there is shown in Figure 6 a pre-assembled car bed frame generally indicated at 10, and in Figure 7 there is shown a pre-formed, flexible child-supporting bag member 12 which is adapted to be selectively connected to, or disconnected from, the frame that is shown in Figure 6. More particularly, the car bed frame, as seen in Figure 6, includes a continuous, rectangular articulated border frame which is composed of a pair of complementary U-shaped members 14 and 16 whose legs are pivotally connected to each other on pins, or rivets, 18 and 20.

The U-shaped member 14 defines a leg member 14a, an end member 14b, and another leg member 14c; similarly, the U-shaped member 16 defines a leg 16a, an end member 16b, and a leg 16c. The legs 14a and 16a are pivoted for rotation about rivet 18, and the legs 14c and 16c are pivoted for rotation about the rivet 20.

The rectangular border frame is supported on a pair of leg-defining, U-shaped supports 22, the legs of which are pivotally connected to the elongated sides of the rectangular border frame by means of rivets, or pins, 24 located adjacent the corners of the rectangular border frame. The U-shaped supports 22 are maintained in their frame-supporting position of Figure 6 by means of elongated, articulated brace members 26, the segments of which are arranged to fold about pivot hinge 27. The hinge 27 is preferably of the encased non-pinching type, and is well known in the art. One end of the diagonal brace member 26 is connected to an adjacent leg portion of support 22, at a point spaced below the pivot 24, by means of pivot 28. The upper end of the diagonal brace member 26 pivotally connects to the side of the border frame at pivot 30, which is spaced from the pivot connection 24.

The car bed frame is preferably provided with a pair of carrying bails, indicated at 32, the legs of which are pivotally connected at 34 to the sides of the border frame adjacent pivots 30. The U-shaped members 32 and 22, and the brace members 26 are so dimensioned and shaped with offset portions, as seen in the drawings, that the entire framework may be folded substantially flat to provide a very compact package for shipping. Thus, in Figure 2 there is illustrated how the bail member 32 may be swung so that its bight is positioned outwardly of end member 14b and so that member 32 lies substantially in the same plane as the frame member 14, while at the same time it avoids interference with the brace member 26 which is positioned to be disposed between support 22 and bail 32. Figure 1 illustrates the bail members 32 when they are swung into adjacent relation for use in carrying the car bed therefrom.

Each of the two articulated sides of the car bed frame includes a specific type of latch, the details of one such latch being best seen in Figures 3–5. Referring to Figure 3, it will be seen that leg 14a overlaps a portion of leg 16a, and in that respect leg 14a is referred to as an outer leg and leg 16a as an inner leg. The said legs 14a and 16a are pivoted on rivet 18. The inner leg 16a carries a stop stud or rivet 36 which extends outwardly of the inner leg member 16a, with the head of rivet 36 spaced from leg 16a by means of enlarged shank portion 36a. The outer leg member 14a defines a downwardly-opening stud-engaging hook 38 which is located and arranged to engage the enlarged shank portion 36a of stud 36 when the legs 14a and 16a are in alignment, as seen in Figures 1 and 6.

The inner leg 16a carries an elongated, flat, resilient member 40 which is normally biased to lie flat against the innermost side of leg 16a. The elongated member 40 extends substantially radially of pivot pin 18, and the distal end thereof is non-rotatably secured to leg 16a by any appropriate means, such as by means of spot welding, or by the use of a pair of rivets. The other end of member 40 defines an outwardly-turned flange, or latching member, 42 which extends transversely of the legs 16a and 14a. The inner leg 16a is provided with a rectangular aperture 44, and the outer leg 14a is provided with a rectangular aperture 46, which are in register when the said legs are aligned, and through which extends the latching member 42 under the bias of the resilient member 40. The resilience of member 40 causes the latching member 42 to normally seek the position that is seen in Figure 4.

The inner leg 16a is apertured at 48, at a point spaced from the overlapping portion of leg 14a, and carries therein a manual control button 50. The button 50 has a manually engageable head 52 and a second head 54 for engagement and cooperation with resilient member 40 at a point intermediate the ends of member 40. The aperture 48 is provided with a beveled bore portion 48a which cooperates with a beveled portion 56 of head 54, as best seen in Figure 5, the said bevels permitting the resilient member 40 to lie as close as possible adjacent the leg member 16a, to permit entrance of the latching member 42 to the extent as seen in Figure 4. The manual control button 52 affords means for actuating said resilient member to withdraw the extended end of latching member 42 from the aperture 46 in the outer leg 14a, to thereby release the latch and permit of relative pivotal folding movement of the legs 14a and 16a. The latching member 42 is provided with an outwardly-facing sloped edge 60 against which the outer leg is adapted to engage cause said latching member to retract as the legs 14a and 16a are swung from a folded position, such as seen in Figure 2, toward the latching position with the frame unfolded, as seen in Figures 1 and 6. The lower edge 62 of latching member 42 is squared off so as to engage the lower edge of the apertures 44 and 46 to resist movement of the legs out of the latched position.

Now referring to the pre-formed flexible child-supporting bag member 12 shown in Figure 7, said bag member is shaped to define a bottom wall 70 and a plurality of upright sides having thereon a plurality of upwardly-extending, spaced flexible tongues. More specifically, the bag shown in Figure 7 defines a bottom 70, a pair of ends 72, and a pair of elongated sides 74. The upper portion of each end wall 72 defines a single tongue member 72a. The upper portion of each side wall 74 defines a pair of relatively narrow tongue members 74a and a pair of wider tongue members 74b. The various tongue members are spaced from each other to provide recesses at selected points. Each of the tongue members 72a, 74a, and 74b carry at least one pair of spaced snap-connector elements arranged in vertical alignment with the uppermost snap-connector element designated 76 and the lowermost snap-connector element designated 78.

The bag 12 may be connected to the frame 10 by looping the tongues over the rectangular border frame and then by connecting each pair of snap-connectors 76 and 78 together, thereby forming a plurality of supporting loops for supporting the bag 12 from the border frame. It will be seen that each of the narrow tongues 74a is positioned between the pair of pivots 24 and 30. The tongue 74a is thereby positioned to either engage the leg member 22 or the brace member 26, in the event there is any tendency of the bag to creep along the rectangular border frame. Thus, the tongues 74a serve both as a supporting loop for the bag member 12, and as means for peripherally locating the bag member on the frame and for restricting peripheral creep of the bag member on the frame.

The bag member 12 may also be provided with an elongated strap member 80 provided with a loop 82 at the extended end thereof and being secured at its other end to one end wall of the bag member. This arrangement provides that when the car bed is folded to the position as shown in Figure 2, then a transverse frame member (not shown) may be threaded through loop 82 and may be connected at its ends to the legs 14a and 14c, thereby providing a restraint for the seat arrangement shown in Figure 2, with the strap 80 adapted to be disposed between the legs of a seated child.

It will be seen that the recesses provided by the spacing of the tongues 72a, 74a, and 74b are such to accommodate and expose the points where there are pivotal connections between the segments of the frame 10. Thus, a recess is provided between tongues 72a and 74a which accommodates the corner of the rectangular frame and also exposes the pivot point 24 between the leg 22 and the frame. The recess between tongues 74a and 74b accommodates and exposes the pivot point 30 between diagonal brace 26 and the frame, and the pivot point 34 between bail 32 and the frame. The recess between the pair of adjacent tongues 74b accommodates and exposes the pivot point 18 between the two U-shaped border frame members, and also provides access to the latching mechanisms that are provided.

It will be understood that the bag member 12 of Figure 7 may be manufactured wholly separate from the frame 10 shown in Figure 6, and there need be no sub-assembly operations which necessitate the presence of both the bag 12 and the frame 10. The two sub-assemblies may thus be manufactured separately and may be packed, if desired, either separately or in a single container and shipped to the consumer for assembly. The bag 12 may also be readily removed from the frame to permit washing of the bag without having to manipulate both bag and frame, as has heretofore been required when bags were integrally connected with the frame.

The removability of bag 12 from frame 10 for the purposes of ease in washing the bag is not the only advantage afforded. The only portion of the car bed readily susceptible of damage is the fabric bag. In constructions wherein the bag is non-removably attached to the frame, once the bag is seriously damaged the entire car bed becomes a total loss to its owner. On the other hand, with the readily removable bag of this development, replacement bags may be sold to car bed owners at a small fraction of the cost of an entire unit.

In the operation of the novel latching means hereinabove described, in operating the frame from the position of Figure 2 to the position of Figure 1, it is only necessary to grasp end member 14b in one hand and end member 16b in the other hand and pull in opposite directions in a snap action, as if to spread them. This will cause the frame members 14 and 16 to pivot about rivets 18 until said frame members reach the position in Figure 1. The edges 60 of latching members 42 will engage portions of frame member 14, causing the latching members to automatically retract until apertures 44 and 46 are in register, at which point the latching members will automatically thrust outwardly, lock the frame members in the position of Figure 1.

The latching means furthermore provide for a very rigid connection between frame members 14 and 16, as not only are the legs thereof connected through rivets 18, but also a rigid connection is provided by means of latching members 42 extending through registered apertures 44 and 46, and also leg 14a engages stop member 36 carried by leg 16a. These three points of connection, disposed over a substantial portion of the overlapping lengths of legs 14a and 16a, provides an improved rigid construction adjacent the mid-span of the long sides of the border frame of the car bed's frame.

In operating the frame from the position of Figure 1 to the position of Figure 2, the leg 16a is grasped in one's left hand and leg 16c is grasped by the right hand. The buttons 50 are then simultaneously pressed inwardly, releasing the latching means, while the structure is supported by the operator's hands.

The weight of frame member 14 and the bag portion supported thereby will then automatically pivot frame member 14 about rivets 18 toward the position of Figure 2. While prior spring-loaded latches require a pulling action to effect release of the latched members, the present development only requires a compression, or squeezing pressure, to effect release. It is submitted that a squeezing pressure is more readily applied than is a pulling action, particularly when the hands are simultaneously being used for grasping. Thus it will be seen that the latching means herein provides for a simplified and efficient operation.

While there has been shown and described a particular embodiment of this invention, it will be obvious to those skilled in the art that various changes and modifications may be made therein without departing from the invention and, therefore, it is intended in the appended claim to cover all such changes and modifications as fall within the true spirit and scope of the invention.

What I claim as new, and desire to secure by Letters Patent of the United States, is:

A lockable hinge comprising, in combination, first and second flat elongated members adapted to hinge between a first position wherein the elongated members are overlappingly aligned with their longitudinal axes parallel and a second position wherein the members are overlappingly transverse to each other; a hinge pin extending through the longitudinal axes of said first and second members; the first member having, along its longitudinal axis and spaced, in order, from said hinge pin, a latch aperture through said member, a stop stud extending from said first member into the plane of the second member, and a manual control button slidably positioned in an aperture in said first member and presenting spaced heads thereon disposed on opposite sides of the first member, the second member having a relatively short portion thereof which overlaps said first member and which has, along its longitudinal axis and spaced, in order, from said hinge pin, a latch aperture through said second member adapted to be aligned with said latch aperture in said first member and a stud-engaging part adapted to engage said stop stud when the first and second members are overlapping aligned, the adjacent terminal end of the second member being closer to the hinge pin than said manual control button; and a locking means for said hinge including an elongated flat spring member whose longitudinal axis lies parallel to the longitudinal axis of said first member, said spring member being disposed on the side of the first member opposite to said second member, one end of said spring member being secured to said first member at a point further from the hinge pin than the spacing of the control button from the hinge pin, the other end of said spring member defining a latch element extending transversely of the axes of said first and second members and normally positioned in the latch aperture of the first member and adapted to move under the bias of said spring member into the latch aperture of the second member, a portion of the spring member intermediate its ends overlying one head on said control button and adapted to be engaged and moved by said control button to selectively effect withdrawal of the latch element from the latch aperture in said second member to unlatch said hinge.

References Cited in the file of this patent

UNITED STATES PATENTS

| | | |
|---|---|---|
| D. 184,347 | Gevertz | Feb. 3, 1959 |
| 1,446,924 | Nicholson | Feb. 27, 1923 |
| 1,885,493 | Tyler | Nov. 1, 1932 |
| 2,410,560 | Witte | Nov. 5, 1946 |
| 2,433,570 | Markkula | Dec. 30, 1947 |
| 2,601,885 | Irvine | July 1, 1952 |
| 2,601,999 | Sly | July 1, 1952 |
| 2,617,119 | Linden | Nov. 11, 1952 |
| 2,636,548 | Berlin | Apr. 28, 1953 |
| 2,723,420 | Rusch | Nov. 15, 1955 |
| 2,730,163 | Goldberg | Jan. 10, 1956 |